UNITED STATES PATENT OFFICE.

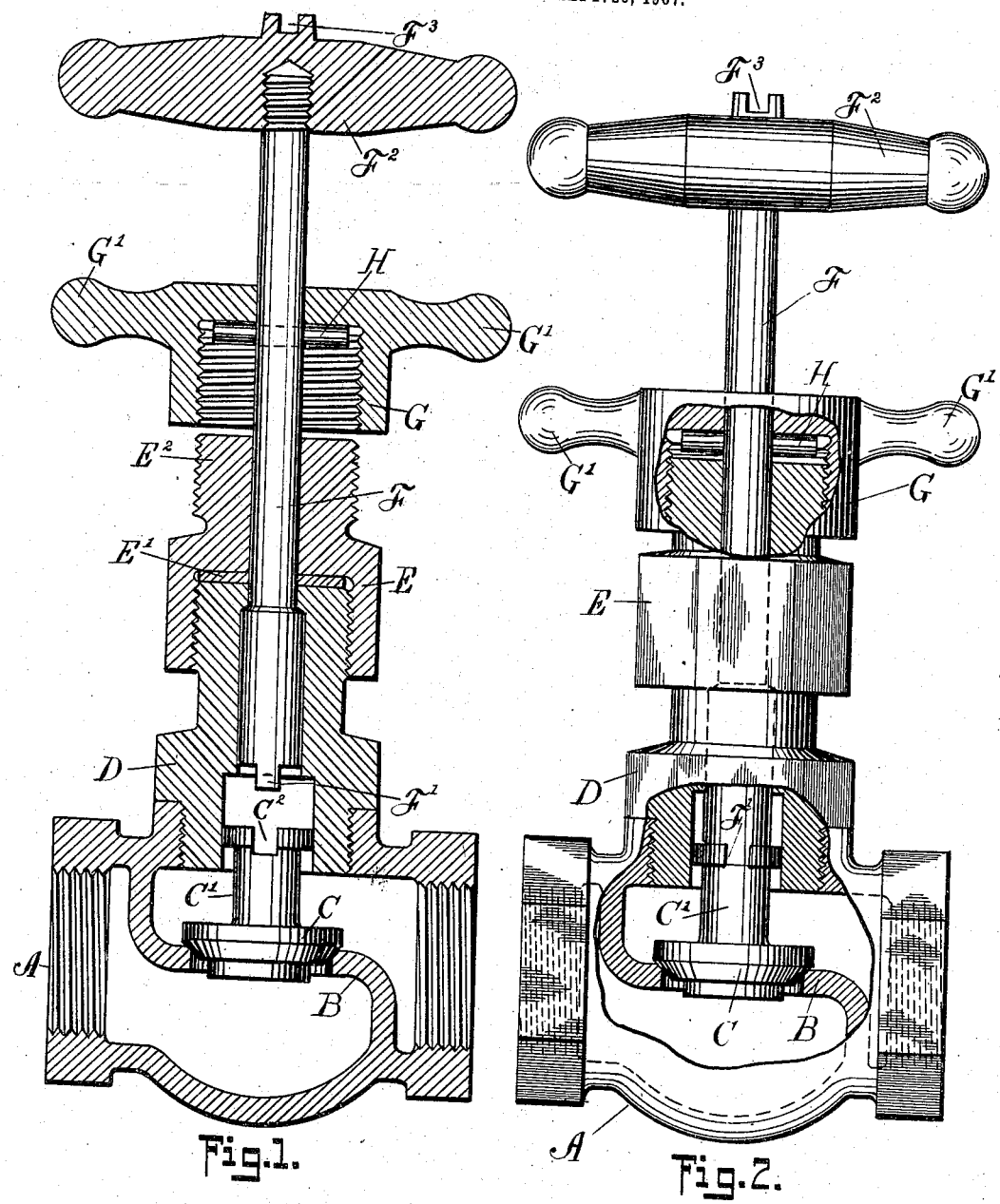

MILTON P. MAXWELL, OF HALSEY, OREGON.

GRINDING ATTACHMENT FOR CHECK-VALVES.

No. 884,942.  Specification of Letters Patent.  Patented April 14, 1908.

Application filed September 26, 1907. Serial No. 394,661.

*To all whom it may concern:*

Be it known that I, MILTON P. MAXWELL, a citizen of the United States, and a resident of Halsey, in the county of Linn and State of Oregon, have invented a new and Improved Grinding Attachment for Check-Valves, of which the following is a full, clear, and exact description.

The object of the invention is to produce a new and improved attachment for check valves, arranged to permit of conveniently and quickly regrinding the check valve on its seat whenever desired, and without requiring opening of the check valve casing or disconnecting the same.

The invention consists of novel features and parts and combinations of the same, which will be more fully described hereinafter and then pointed out in the claims.

A practical embodiment of the invention is represented in the accompanying drawings, forming a part of this specification, in which similar characters of reference indicate corresponding parts in both views.

Figure 1 is a sectional side elevation of the improvement as applied and in a non-active position, and Fig. 2 is a like view of the same, parts being in elevation, the improvement being in an active position for regrinding the check valve on its seat.

The body A, of the check valve is provided with the usual valve seat B, on which is adapted to be seated the valve C, having its short valve stem C' extending loosely in the bonnet D, screwed or otherwise secured to the valve body A and provided with a suitable packing nut E. The upper outer end of the stem C' of the valve C is provided with a recess C², adapted to be engaged by a plug F', depending from the lower end of a rod or shank F, slidably held in the bonnet D and nut E, and carrying at its upper, outer end a handle F², for conveniently manipulating the rod or shank F whenever it is desired to regrind the valve C at the time the valve is held firmly to its seat B. The handle F² is provided at the top with a cross slot F³ for the application of a screw driver or other tool to turn the rod F when regrinding the valve C. Normally the rod F is held by frictional contact with the packing E' in the nut E in an uppermost inactive position, as shown in Fig. 1, to allow the valve C to function in the usual manner, but when it is desired to regrind the valve C on its seat B, then the operator pushes the rod F downward to engage the lug F' with the recess C² and then turns the rod F, so as to turn the valve C with it while the latter is on its seat B.

In order to hold the valve C with the desired force down on its seat B during the regrinding operation, the following arrangement is made: On the upper threaded end E² of the packing nut E screws a feed nut G having handles G', to permit the operator to conveniently screw the nut G up or down on the threaded end E² of the packing nut E. The feed nut G is adapted to bear on a pin H held on the rod or shank F, so that when the feed nut G is screwed down on the packing nut E, it moves the pin H and consequently the rod F downward, to firmly hold the valve C to its seat B during the regrinding operation, that is, during the time the rod F is turned, while engaged with the stem C' of the valve C. After the valve C is reground on its seat B, the feed or retaining nut G is screwed upward and then the rod F is lifted back into its normal inactive position, as shown in Fig. 1. It is understood that the rod F serves practically as a screw driver for turning the valve C, and the rod F is fed downward by the operator screwing the feed nut G downward during the regrinding operation.

The device is very simple and durable in construction and can be readily applied to check valves as heretofore constructed.

Having thus described my invention, I claim as new and desire to secure by Letters Patent:

1. The combination with the check valve body, of a stem, means in connection with the stem for locking the valve thereto, a pin arranged transversely of the stem, a feed nut on the body engaging the pin, and a packing for frictionally retaining the stem out of engagement with the valve.

2. The combination with the check valve body, of a stem, means in connection with the stem for locking the stem in the valve, a pin arranged transversely of the stem, a feed nut on the body engaging the pin, a packing for frictionally retaining the stem out of engagement with the valve, and a packing nut for expanding the packing.

In testimony whereof I have signed my name to this specification in the presence of two subscribing witnesses.

MILTON P. MAXWELL.

Witnesses:
 JNO. W. BRESSLER,
 W. H. WALTON.